(12) United States Patent
Roberts et al.

(10) Patent No.: US 8,055,615 B2
(45) Date of Patent: Nov. 8, 2011

(54) METHOD FOR EFFICIENT STORAGE NODE REPLACEMENT

(75) Inventors: Nathaniel David Roberts, Ogden, IL (US); Jeanie Zhiling Zheng, Champaign, IL (US); Chung Hae Sohn, Champaign, IL (US); Kihwal Lee, Champaign, IL (US); John Vijoe George, Champaign, IL (US)

(73) Assignee: Yahoo! Inc., Sunnyvale, CA (US)

( * ) Notice: Subject to any disclaimer, the term of this patent is extended or adjusted under 35 U.S.C. 154(b) by 298 days.

(21) Appl. No.: 12/547,409

(22) Filed: Aug. 25, 2009

(65) Prior Publication Data

US 2011/0055156 A1 Mar. 3, 2011

(51) Int. Cl.
*G06F 17/00* (2006.01)
(52) U.S. Cl. ........ 707/610; 707/611; 707/616; 707/626; 707/633; 707/634
(58) Field of Classification Search .................. 707/610, 707/611, 616, 626, 633, 634
See application file for complete search history.

(56) References Cited

U.S. PATENT DOCUMENTS

| | | | |
|---|---|---|---|
| 7,496,646 B2 * | 2/2009 | Casper et al. ................. | 709/223 |
| 7,555,527 B1 * | 6/2009 | Slaughter et al. ............. | 709/213 |
| 2004/0044755 A1 * | 3/2004 | Chipman ...................... | 709/223 |
| 2010/0195538 A1 * | 8/2010 | Merkey et al. ................ | 370/255 |

OTHER PUBLICATIONS

U.S. Appl. No. 12/547,413.

* cited by examiner

*Primary Examiner* — Thanh-Ha Dang
(74) *Attorney, Agent, or Firm* — Weaver Austin Villeneuve and Sampson LLP (57) ABSTRACT

Methods and apparatus are described for a horizontally scalable high performance object storage architecture. Metadata are completely decoupled from object storage. Instead of file names, users are given a locator when the object is uploaded and committed. Users can store the locator along with their own metadata or embed it directly in the static content. Clients can choose which storage nodes to store data on based on dynamic measures of node performance. Since there is no coupling among storage servers, performance can scale horizontally by adding more nodes. The decoupling also allows the front end services and storage to scale independently. High service availability is achieved by object-level synchronous replication and having no single point of failure. Failed nodes are rebuilt using copies of data in other nodes without taking the cluster offline. In addition to the replication, the ability to add or remove nodes on-line reduces maintenance-related service downtime.

12 Claims, 7 Drawing Sheets

METHOD FOR EFFICIENT STORAGE NODE REPLACEMENT

RELATED APPLICATION DATA

The present application includes subject matter related to U.S. patent application Ser. No. 12/547,413 entitled METHOD FOR DISTRIBUTED DIRECT OBJECT ACCESS STORAGE, filed on the same date as the present application. The entire disclosure of this application is incorporated herein by reference for all purposes.

BACKGROUND OF THE INVENTION

The present invention relates to data storage, and more specifically to distributed data storage in a cluster of storage nodes.

Today's Internet users directly or indirectly generate and retrieve a large number of objects. When hundreds of millions of users are participating in such online activities, the scalability, performance and cost of the storage become critical to service providers like Yahoo!. Many of the traditional solutions tend to be less efficient for supporting a large number of concurrent random and cold (i.e. uncached) data accesses.

A large number of concurrent and independent data accesses means relatively lower spatial locality among the data, which in turn implies fewer cache hits and more random seeks for rotating media such as hard disks. This results in increased latency and lower throughput. If the data objects are small, the fixed per-object overhead such as metadata lookup and translation is significant, especially if it involves extra disk seeks.

Many high performance storage systems such as Lustre are optimized for high-performance cluster (HPC) types of workloads which involve moving large files quickly. Their performance often suffers when accessing a large number of small, cold files, mainly due to the overhead of metadata operations. Some distributed filesystems such as Ceph partition the name space to allow more than one metadata server to be present, which alleviates the metadata-related bottleneck to some degree. Although both Lustre and Ceph are based on object storage back-ends, they expose only filesystem APIs on top, which incurs additional overhead.

SUMMARY OF THE INVENTION

According to the present invention, methods, systems, and computer program products are presented for recreating a storage node in a cluster. A replica chain is created for each object stored in the cluster. The replica chain indicates which nodes in the cluster store replicas of the associated object and storage addresses of the object on each node. The replica chain further designates a source node responsible for contributing the object when restoring a failed node. During restoration of the failed node, objects stored on each source node are identified without reference to the failed node. Object are recreated on the replacement node using remaining nodes in the cluster without reference to the failed node. Each object is copied from its designated source node to the replacement node according to the replica chain. When the objects are restored, the replacement node is designated as replacing the failed node.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Existing distributed storage systems generally implement a conventional filesystem interface with path names, file metadata, access control, and the like on top of distributed storage. These abstractions allow flexibility for the system to decide such parameters as where to store an object or how many replicas (copies) to keep. Such decisions are generally invisible at the application level. However, the overhead required to maintain and translate the abstractions into physical storage addresses can be significant. Other distributed systems eliminate path translation and other metadata for faster object access. However, these systems offer little dynamic flexibility in object placement and retrieval.

According to the present invention, a distributed object storage system is presented that is both flexible and efficient. Data is stored in one or more independent storage nodes. Objects are identified with a data locator, which indicates both the nodes storing an object and the storage addresses on those nodes where the data is stored. This locator is used in place of file names to specify data for update and retrieval. By encoding the storage addresses of objects, locators eliminate metadata lookups for quicker data access. Flexibility is preserved because decisions about which nodes to store data on and which nodes to retrieve data from can be made independently for each piece of data. According to some embodiments, performance monitors continuously measure the performance of storage nodes so that applications can make dynamic decisions about which storage nodes to use.

Figure 1:
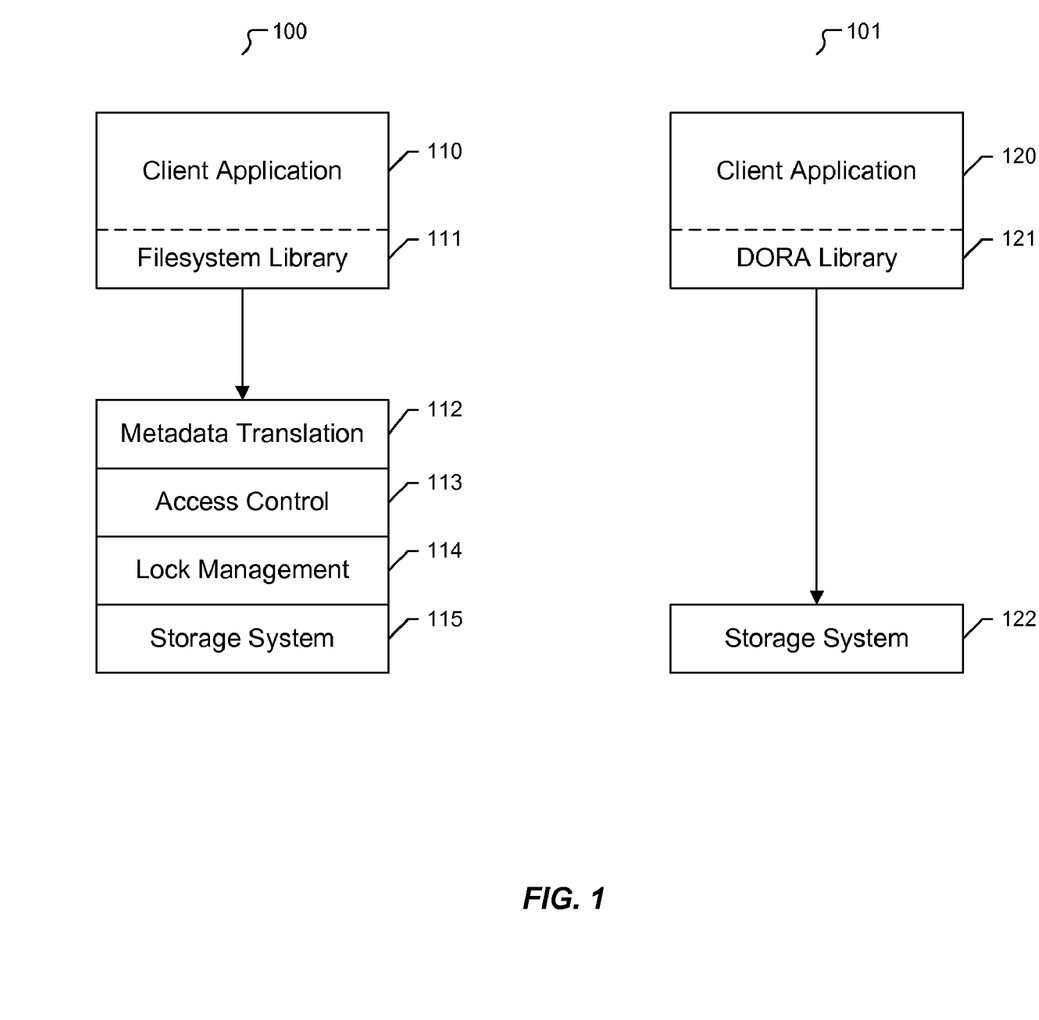
FIG. 1 illustrates differences between a conventional distributed filesystem and an embodiment of the invention.

FIG. 1 illustrates differences between a conventional distributed filesystem and an embodiment of the invention. Two software stacks 100 and 101 represent alternative code paths from executing application programs accessing data through respective filesystems. Stack 100 depicts a conventional approach. Examples of such conventional distributed filesystems include Network File System (NFS) from Sun Microsystems, Lustre from Carnegie Mellon University, and Ceph from University of California, Santa Cruz. The application program 110 includes library code 111 for accessing the filesystem. The library code may be tailored to the specific filesystem in use. More often, the library code comprises a thin wrapper for generic system calls, with the underlying operating system translating those calls into specific operations on the particular filesystem in use (such as NFS). In either case, access to file data is mediated by one or more processes (running programs on the same or other computers) separate from the application. The arrow in software stack 100 illustrates this separation between the client application 110 and one or more system processes comprising components 112-115.

When accessing a file on behalf of a client application, the system performs several functions. First, the system performs metadata lookups and translations 112. Client application 110 identifies the file to access using a file path, which is a string specifying a file's location relative to directories on the filesystem. The file path is metadata identifying the file; it does not contain the data comprising the file, nor does it provide a storage address where the data is stored. The metadata translation component 112 looks up the file path to verify that it refers to a valid file in the filesystem. Then it translates the file path into a storage location such as a disk block or an inode indicating where the file data is stored on a storage device.

Many filesystems also provide access control. Access control determines who is allowed to access a file and what operations they may perform on it. Access control component 113 verifies that the requesting application 110 has permission to perform the requested operation on the file. Lock management component 114 manages locks on the file, preventing multiple concurrent modifications that could corrupt the file's contents. Finally, storage system 115 uses the storage address provided by the metadata component to read or write the file's contents on a storage device such as a disk drive, flash memory device, RAID array, SAN appliance, etc.

While components 112-115 are conceptualized as separate entities, it should be noted that the various conventional implementations may combine these functions in different ways. For example, a filesystem driver running in an operating system kernel may provide all of these functions in a single component. Similarly, these components may be split across multiple computing devices, such as Lustre's separate Metadata Server and Object Storage Server.

Stack 101 illustrates accessing an object according to various embodiments of the present invention. Like a file, an object comprises any structured or unstructured data such as, for example, an HTML document, a JPEG image, or an MP3 recording. It will be understood that these are merely a few examples of the wide variety of objects that may be stored and retrieved in accordance with embodiments of the invention. Objects may lack some metadata associated with files, particularly a path string giving the location of the file relative to directories in a filesystem. For purposes of this disclosure, the terms object and data will be used interchangeably unless otherwise indicated. Certain aspects of the invention will be discussed in terms of an embodiment called the Direct Object Repository Architecture (DORA). It should be understood that the invention is not limited to this embodiment.

Application 120 includes DORA library code 121 directed to the present invention. In a DORA system, data is identified by a data locator rather than a file name. The locator encodes a storage location on a storage device where the data resides. This allows the DORA library 121 to communicate directly with storage system 122 without the need for metadata lookup and translation. The storage system simply retrieves the data from a storage device at the location specified by the locator.

Removing the metadata component from the stack enables quicker access to data by reducing processing overhead. It also reduces I/O and memory usage, since metadata translations often require additional reads from a storage device. To further reduce overhead, other functions such as access control and lock management are removed from DORA entirely (these can be provided at the application level if needed). Consequently, DORA provides very quick and efficient access to data with minimal overhead. Other advantages will become apparent as well.

Figure 2:
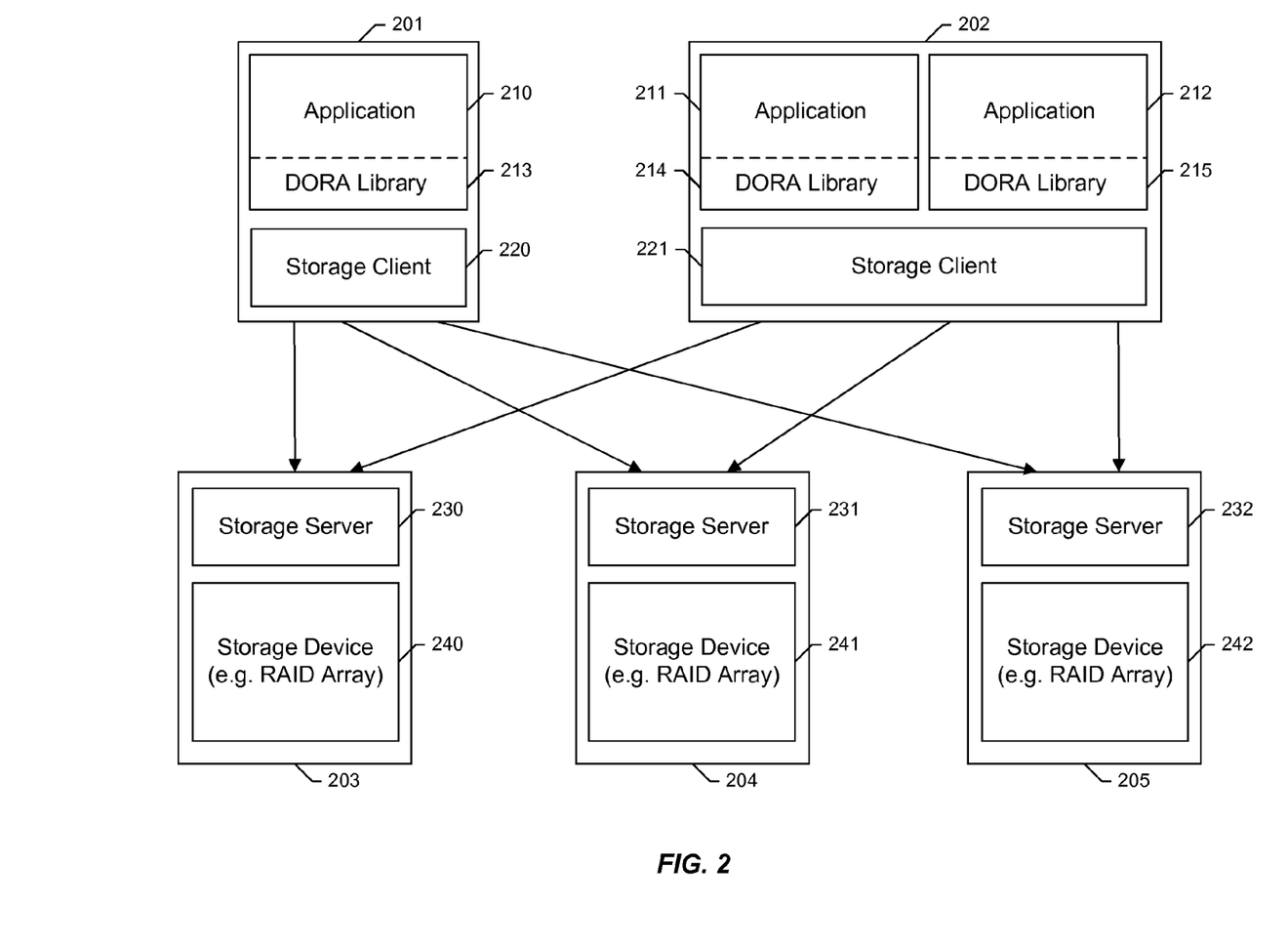
FIG. 2 shows an example storage cluster according to an embodiment of the invention.

FIG. 2 shows a storage cluster according to an embodiment of the invention. The cluster comprises nodes 201-205. Application nodes 201-202 run application programs in the cluster. Storage nodes 203-205 provide data storage services for the application nodes. Application 210 runs on node 201. Application 210 could be any application utilizing cluster services. For instance, it could be an Apache web server hosting the Flickr photo sharing service. Application 210 includes DORA library code 213 for interfacing with the DORA system. A DORA application programming interface or API (not shown) provides a mechanism for the application to interface with the library to access data in the DORA system.

Figure 3:
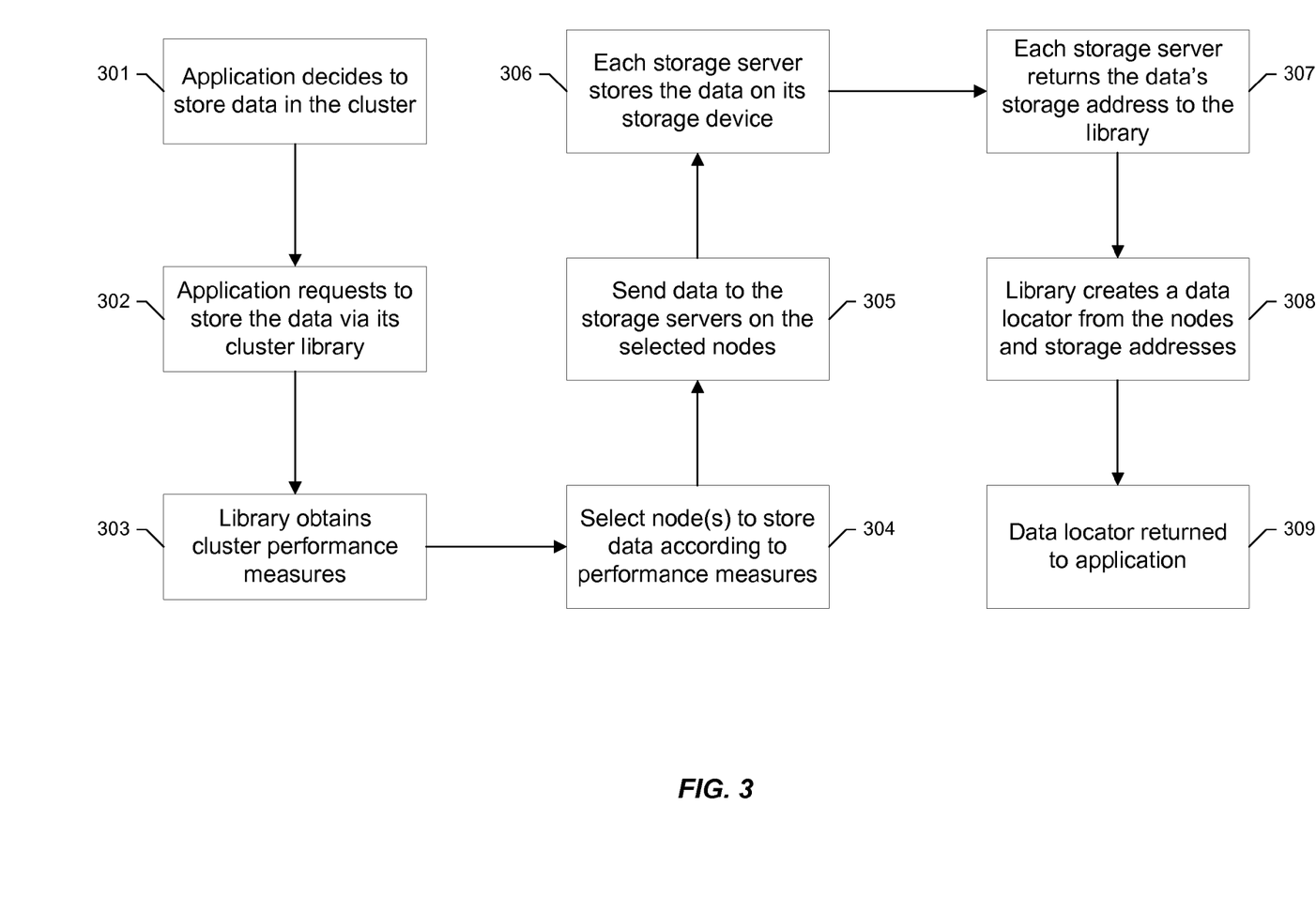
FIG. 3 depicts a process of storing data in the example cluster of FIG. 2.

Library code 213 communicates with storage client 220 via any of a wide variety of suitable inter-process communication mechanisms, including system calls, pipes, shared memory, remote procedure calls, message passing, or network communications. Such techniques can also be used for communication between the application 210 and library 213, although a conventional approach of function calls in a shared address space may also be employed as depicted in FIG. 3. In accordance with a particular class of implementations, client 220 and library 213 communicate via shared memory on node 201. In this example, storage client 220 runs as a separate process on application node 201, but other configurations on local or remote nodes are contemplated. In fact, in some embodiments storage client 220 may comprise a library linked into the process space of application 210.

Storage client 220 gathers dynamic performance measures on each storage node in the cluster. These performance measures may be used for dynamic load balancing among the storage nodes. Storage client 220 may also route messages from the DORA library to the appropriate storage server. In some embodiments, each storage client maintains persistent connections to each storage server for monitoring availability and performance metrics and/or efficient message passing. According to various embodiments, each application node runs a single storage client instance. Thus, for example, DORA libraries 214 and 215 both communicate with storage client 221 on application node 202.

In certain embodiments, storage clients are largely decoupled from the storage servers. Each storage client maintains a list of storage servers in the cluster. This list determines which storage servers the client interacts with, such as gathering performance data on. When storage nodes are added to the cluster, the lists can be updated to reflect these changes. For example, a shell script may be run to modify the list on each storage client. A storage client may start using the new storage nodes when it processes the updated list. This may occur, for example, as the storage client periodically scans the list for changes.

Similarly, adding a new storage client requires no configuration changes to the cluster in some embodiments. Storage nodes need not keep track of storage clients, nor do storage clients keep track of each other. The new client can participate in cluster operations right away. Thus adding a new storage client to the cluster does not incur any service downtime. Clients and servers may be added or removed as needed, leading to efficient scaling of the cluster size.

Storage server 230 manages storage of objects on storage node 203. Data is stored in storage device 240, which may comprise any of a wide variety of storage devices including, for example, a disk drive, a flash memory device, a RAID array, a SAN appliance coupled with node 203, etc. Device 240 may also comprise a virtual or logical storage device. Storage server 230 is responsible for reading and writing data on device 240 and returning requested data to an application node (sometimes via the associated storage client, depending on the embodiment). Storage server 230 may also monitor various performance metrics such as available storage space and processor load for node 203, which it communicates back to the storage clients. Storage servers 231 and 232 provide corresponding services for storage devices 241 and 242 on nodes 204 and 205, respectively. Collectively, a storage client 220 and the storage servers 230-232 with which it communicates implement the storage system 122 of FIG. 1.

Each storage server operates independently of the other storage servers in the cluster. There is no centralized management or coordination of storage nodes, and storage nodes do not know about or communicate with each other except when rebuilding a failed node. This decoupling of nodes in the cluster allows the cluster to efficiently scale in size. Storage nodes can be added to or removed from the cluster while other storage nodes remain online. This allows a cluster to grow without disrupting operations. Additionally, damaged or unavailable storage nodes can be replaced while the cluster remains online. Further operation of the cluster components will be described with reference to FIGS. 3 and 4.

FIG. 3 depicts a process of storing data in the example cluster of FIG. 2. An application has data it decides to store in the cluster (301). For instance, if application 210 is a web server hosting Flickr, the data could be a new photo uploaded by a user. The application passes this data to its DORA library through a defined API (302), e.g., calling a write ( ) function in the library. In some embodiments, the application may also indicate related parameters, such as the number of copies of the data to maintain, where indicating more than one copy means the data is replicated on multiple storage servers. Alternatively, the library itself may decide how many copies to maintain.

As mentioned above, the DORA library obtains the performance measures gathered by the storage client (303). This may be done synchronously, such as by contacting the storage client over a pipe or socket. It may also be done asynchronously without interaction from the storage client, such as by reading the performance measures from shared memory or a message queue. Using the performance measures, the library evaluates performance of the storage nodes in the cluster and selects one or more storage nodes on which to store the data (304). According to various embodiments, the determination may be based on a variety of factors including, for example, available storage capacity, current, expected, or historical load on the processor, I/O bandwidth, or other factors alone or in combination. In some embodiments, the determination is made using a service budget calculated with a Proportional-Derivative feedback control algorithm.

Once the storage nodes are chosen, the library communicates the data to the storage server on each selected node (305). The library may connect to the storage server directly or transfer the data through a storage client. The latter approach may prove advantageous in implementations in which each storage client maintains a persistent connection to every storage node. Data is sent to the storage nodes in parallel for efficiency and speed. The selected storage servers store the data independently and concurrently. The total time to store the data is the maximum time taken by any one of the storage servers.

When each storage server receives the data, it chooses an available storage location on its storage device to store the data (306). Storage operations are very fast because the storage device only needs to store data blocks and not a directory hierarchy or associated file metadata. Available data blocks are chosen and the data written to them. According to some implementations, a conventional filesystem can be used to manage block allocation on the storage device. For example, the storage device may be formatted with the Third Extended filesystem (EXT3) commonly used on Linux machines. EXT3 normally accesses files by path name, which it translates into the address of an inode block on disk. The inode contains pointers to data blocks containing the file's data. By accessing inodes directly, the storage server can use EXT3 to handle data block allocation while avoiding the overhead of metadata translation.

Once the data is stored on the storage device, each storage server communicates the storage address where the data is located back to the DORA library (307). The DORA library uses the storage address from each storage node to create a data locator (308). The data locator identifies each piece of data in the cluster. Like a filename in a conventional filesystem, the data locator is used to retrieve and update the data in the cluster. Unlike a filename however, the data locator directly encodes the storage location of the data in the cluster for efficient access. In one embodiment, the locator comprises the identity of each storage node storing the data and the address of the corresponding inode on each storage device. This can be expressed as a set of couplets "[node id, storage address]", with one couplet for each node storing the data. For example, suppose the data is replicated on nodes 203, 204, and 205 at inodes 4200, 2700, and 3500, respectively. The data locator identifying the data can be expressed as "[node 203, inode 4200]:[node 204, inode 2700]:[node 205, inode 3500]". The storage node identifier may be any value identifying the node, including an IP address or DNS name associated with the storage node, among numerous other possibilities.

After creating the data locator, the DORA library returns the locator to the application (309), e.g., as the return value from a write ( ) API function call. Storing the data locator is the application's responsibility. According to certain embodiments, the system does not maintain copies of each data locator in the system. In such implementations, if the application loses this data locator, retrieving the data from the cluster may not be feasible. The application may store the locator in various ways, including embedding it in a data portion of the program itself, keeping it with other program configuration settings, storing it in an external database, or embedding it in content associated with the data (for example, embedding the locator in a web page or hyperlink associated with the user's Flickr account).

Figure 4:
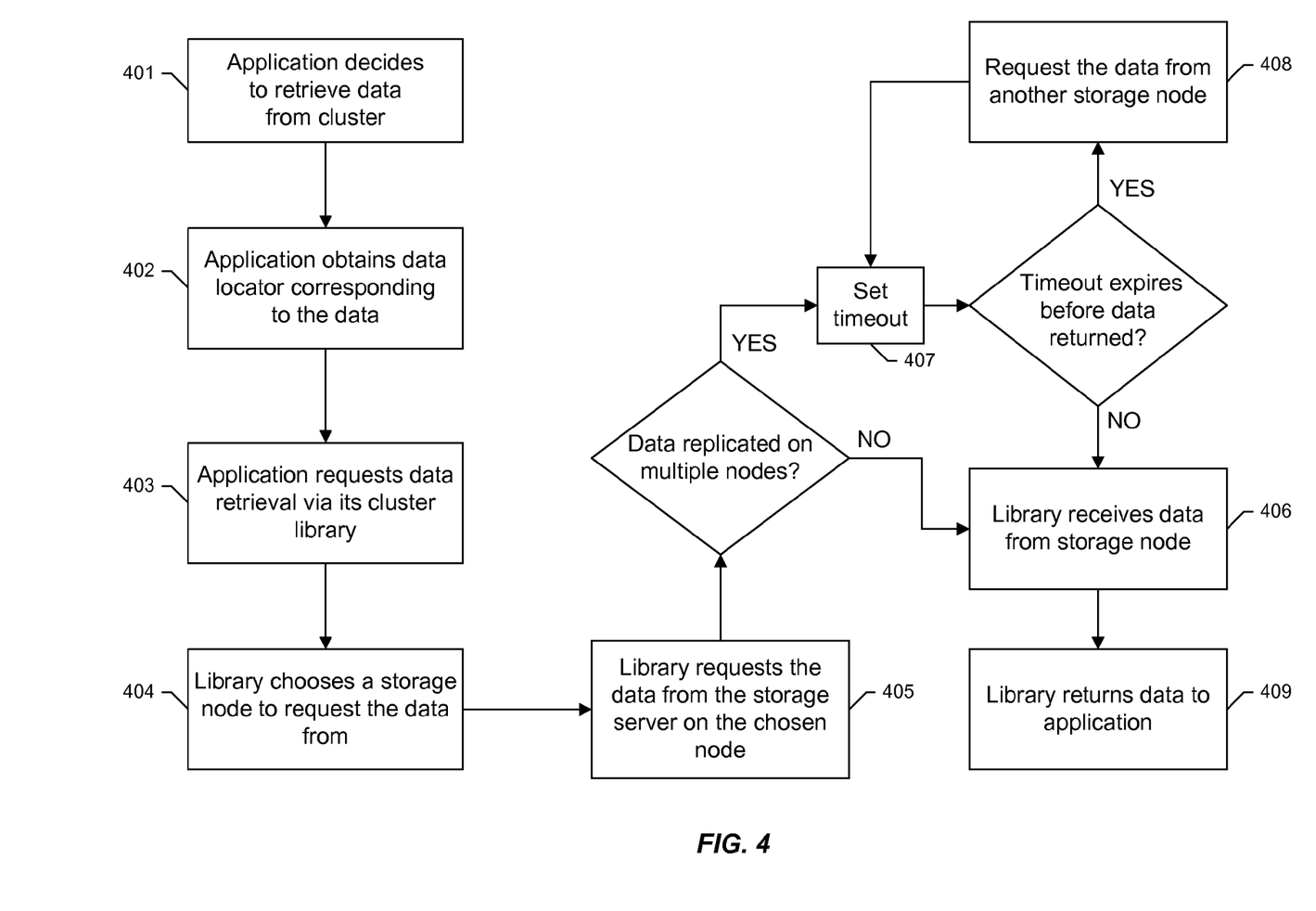
FIG. 4 depicts a process for retrieving stored data from the example cluster of FIG. 2.

FIG. 4 depicts a process for retrieving stored data from the example cluster of FIG. 2. An application decides to retrieve data stored in the cluster (401). The application obtains a locator corresponding to the data (402). Continuing an earlier example, if application 210 is a web server hosting Flickr, the locator may correspond to a photo previously uploaded by a user. How the application obtains the locator is left to the application. As discussed above, in some embodiments, the system does not store locators for applications. The application passes the locator to its DORA library (403), e.g., through a read API function call. The locator identifies one or more storage nodes storing the data and the address of a data structure on the storage device corresponding to the data. For example, in some instances the address comprises an inode number for an inode on the storage device pointing to the relevant data blocks.

The library chooses a storage node from the locator from which to request the data (404). According to some embodiments, this choice may be made with reference to the performance measures gathered by the Storage Client. For example, to retrieve the data quickly, the library may choose the storage node according to lightest processing load, highest available bandwidth, or other performance measures. The node may also be chosen according to a calculation based on multiple performance measures using, for example, a Proportional-Derivative feedback control algorithm.

The library requests the data from the storage server on the chosen storage node (405), either directly or via a storage client. The request includes the storage address corresponding to the data on the chosen storage node. The storage server can retrieve the data quickly from its storage device using the storage address because no metadata lookups or translations are required. In certain embodiments, the data may be retrieved with a single seek operation on the storage device. For example, the storage address may point directly to the data on the device. As another example, the storage device may comprise both flash memory and a disk drive, with the address identifying an inode stored in the flash memory which points to the data on the drive. Minimizing seeks may improve performance, especially when the storage device comprises rotating media, e.g. hard disk drives.

If the data is not replicated on multiple storage nodes, the library waits for the data to be returned from the storage server (406). Otherwise, the library (or the storage client) sets a timeout value (407). If the chosen server does not return the data within the timeout period, the library (or client) may choose another storage node in the data locator from which to request the data (408). The chosen storage node may fail to return the data within the timeout for any number of reasons. The node may be offline, experiencing a hardware failure, or busy serving other requests, among other possibilities. Because multiple storage nodes may each store a complete copy of the data, the data may be retrieved independently from any node identified in the locator.

Depending on the granularity and frequency of the performance measures, some embodiments support very short timeout periods. Shorter timeouts decrease the average read response times of the system. Nodes failing to respond before the timeout can be handled in many ways. An indication to cancel the request for data may be communicated to the storage server on the node. Any data returned from the node after the timeout may be discarded. Alternatively, the library (or storage client) may do nothing and simply accept the data from the first node to return it, whether that node was the target of the original request or a subsequent one.

Once the data is received by the library, it passes the data back to the application (409). For instance, the data or a pointer to it may be passed as the return value from a read API call that the application made to the library. The application may then perform operations on the data or pass it to others. For example, data comprising a photo returned to a web server hosting Flickr may then be sent to a web browser associated with a remote user for display. In other examples, the data may comprise text, graphical, audio, or multimedia advertisements displayed to a user.

According to some embodiments, an application can store its own metadata associated with the data independent of the described cluster. For example, a Flickr webserver may associate a descriptive comment or identifier with photo data stored in the cluster, such as "Bob's first trip to Italy" or "photo_06012009.jpg". The application can store such metadata in any storage location available to it, such as those described for storing data locators. To facilitate such scenarios, some embodiments include one or more metadata servers for applications to store metadata in. The metadata server may provide storage for any metadata the application wishes to associate with the data. The metadata server may also store data locators associated with the metadata for convenience. In some embodiments, the application may retrieve data locators from the metadata server by doing a lookup or using a key. For example, if the metadata server comprises a relational database, a Flickr webserver could retrieve photos from Bob's Italy trip by querying the database for all data locators associated with a key, such as "Bob's first trip to Italy". A query could also be performed using a URL, such as "<//flickr.com/~bob/italy/>". These examples illustrate a few of the numerous possibilities. Any database indexing or retrieval scheme is contemplated.

In these scenarios, it is important to note that the metadata is neither required nor used to retrieve the data from the cluster. Data is retrieved from the cluster using only the data locators encoding its location. The metadata server merely provides an application-level convenience layered on top of the cluster system. Multiple independent metadata servers may be provided. Each application can decide whether or not to use a metadata server, and different applications can choose different metadata servers offering different types of service. This distributed, application-level approach avoids the performance bottlenecks associated with traditional metadata operations.

Figure 5:
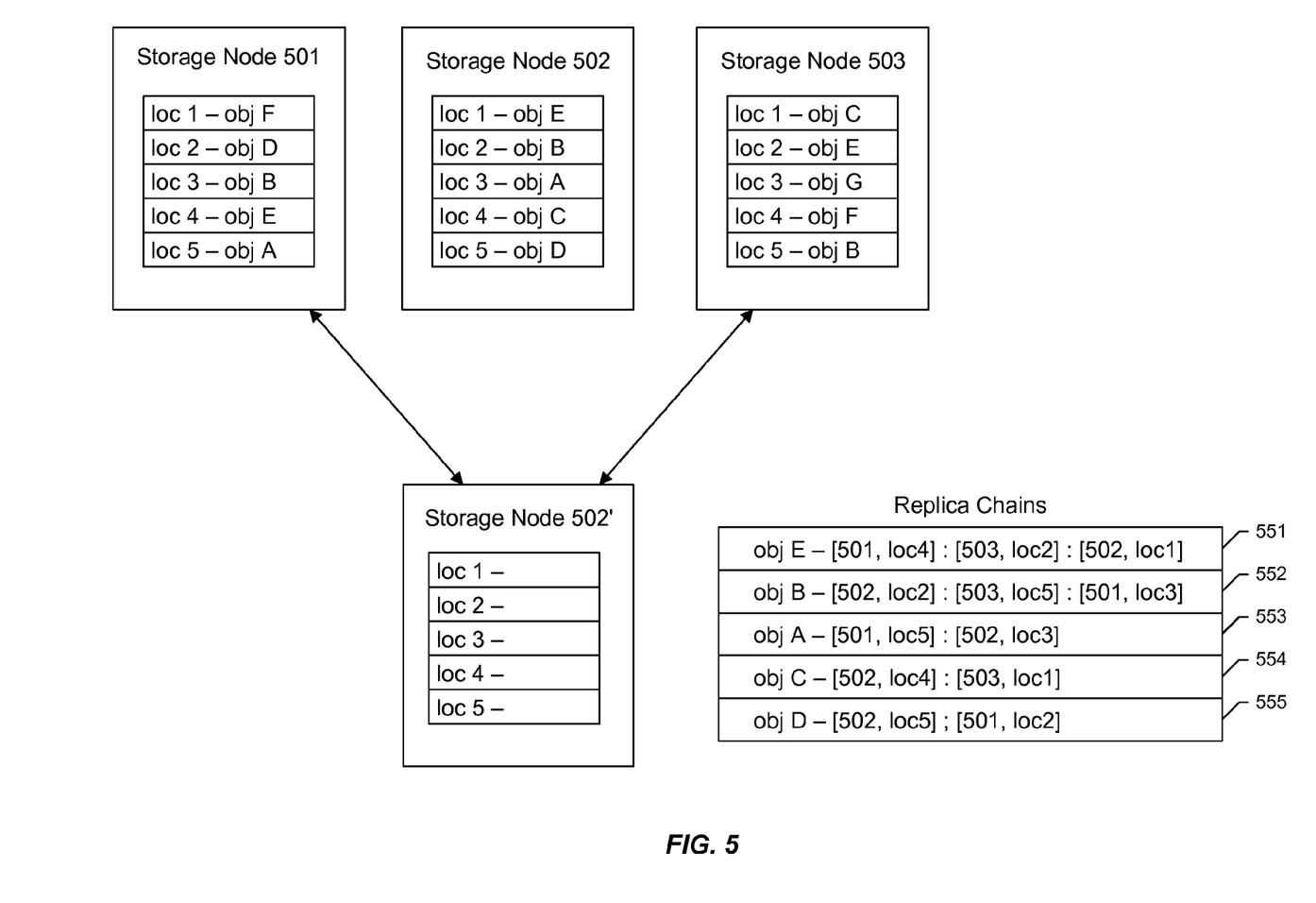
FIG. 5 illustrates a technique for rebuilding a storage node after a failure according to a specific embodiment of the invention.

FIG. 5 illustrates an example of a technique for rebuilding a storage node after a failure in accordance with a specific embodiment of the invention. Replicating data across multiple storage nodes allows data to be retrieved when a particular storage node is unavailable. However, nodes that fail must eventually be replaced to maintain the cluster. The technique to be described allows a failed node to be rebuilt without accessing any data on the failed node. Other nodes in the cluster are used to rebuild the failed node without taking the cluster offline. It should be noted that, while the techniques for rebuilding a storage node enabled by embodiments of the present invention are useful in the types of cluster storage systems described above, they also may be practiced in other contexts involving replicated storage.

Storage nodes 501-503 comprise a cluster of nodes storing a variety of data. In this simplified example, each node has five storage locations for storing data. Each location in nodes 501-503 stores an object labeled A-G each comprising a piece data. Some objects are replicated on multiple nodes. For instance, object E is stored on node 501 (location 4), node 502 (location 1), and node 503 (location 2). Other objects are replicated on two nodes, such as object D (node 501, loc 2 and node 502, loc 5). The number of objects, their placement, and the number of replicas only provide an example to illustrate operation of the system. Likewise, while this example assumes all objects are the same size or that each location has space for exactly one object, those of skill in the art will appreciate that the techniques apply to arbitrarily sized objects and storage locations.

Storage node 502' is a storage node intended to replace node 502. Node 502 may have failed or be otherwise unavailable. In order to replace node 502 without reconfiguring other parts of the system, node 502' will recreate the data on node 502 with the same layout. Once the contents of node 502' match what should be on node 502, node 502 may be removed from the cluster and node 502' dropped in as a transparent replacement. The cluster will continue operation with node 502' operating in place of node 502, the same as if (a fully functional) node 502 had been switched off then switched back on again.

According to a specific implementation, the key to recreating node 502' with the same layout as node 502 without communicating with node 502 is a replica chain. A replica chain is a piece of data associated with each object stored in the cluster. The chain for an object designates which node is responsible for contributing the object's data when restoring another node in the chain. The chain also provides information about the location of each object on each node so a node can be rebuilt with the same layout.

For instance, replica chains 551-555 designate recovery information for each object stored on node 502. Chain 551 indicates that object E is stored on node 501 at location 4, on node 503 at location 2, and on node 502 at location 1. In this example, each node is responsible for providing the object when restoring the next node in the list. The last node in the list provides the object when restoring the first node, as if the list wrapped around at the end (i.e., was circular). According to chain 551, node 501 contributes object E when recreating node 503, node 503 contributes it for node 502, and node 502 contributes it for node 501. Since node 502' is a replacement for node 502, node 502' retrieves object E from node 503. Replica chain 551 also includes the address of object E on node 503 (location 2), making retrieval fast and efficient. When node 502' has retrieved object E, it stores the object in location 1 as indicated by replica chain 551. This places object E in the same location on node 502' as on node 502.

Using replica chains 552-555, node 502' retrieves objects A, B, and D from node 501 and object C from node 503. Node 502' stores these objects in the locations indicated for node 502 by the replica chains. When the process is complete, node 502' contains the same objects in the same storage locations as node 502. Node 502' has been reconstructed into a copy of node 502 by only contacting other nodes in the cluster (i.e., not node 502). Node 502' can now replace node 502 in the cluster. This reconstruction does not require any centralized coordination or control of the nodes, nor does it require taking the cluster offline.

In some embodiments, the replica chain for an object comprises the data locator for the object as described herein. The locator information is treated as a circular list of nodes. In other embodiments, the data may be retrieved from other nodes in the chain, such as by choosing the contributing node according to performance measures such as load or choosing a node at random.

According to certain embodiments, the replica chain stores all externally visible parameters associated with an object. For instance, clusters which do not expose the internal storage address of each object on a node do not need to recreate objects at the same storage address as the failed node. However, they may expose other parameters associated with an object, such as its last update time, a version number, or a generation number. A generation number is a version number that is incremented every time an object is updated. This aids in tracking versions of an object, which can be used to resolve object conflicts when restoring a failed node. Restoring a node without these object parameters may cause errors or data inconsistencies in the cluster. Therefore, such parameters may also be stored in the replica chain to allow recreating the failed node without disrupting cluster operations.

Figure 6:
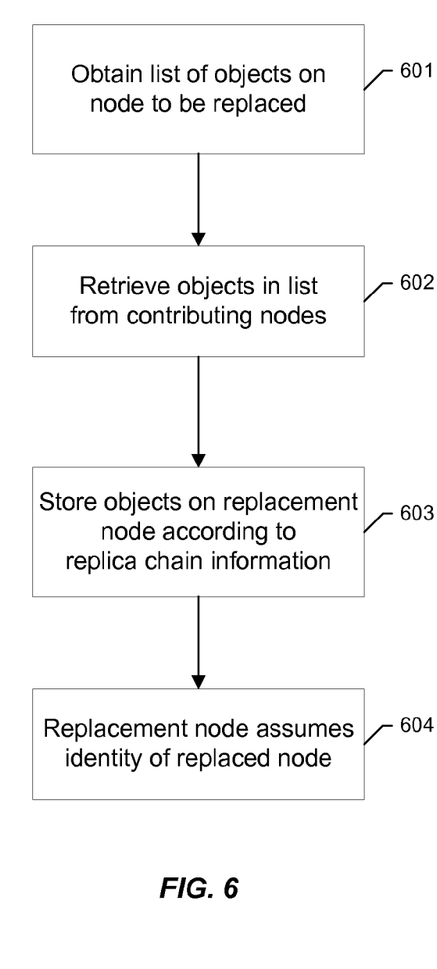
FIG. 6 illustrates a process of recreating a storage node according to a specific embodiment of the invention.

FIG. 6 illustrates a process of recreating a storage node according to a specific embodiment of the invention. A replacement node obtains a list of objects stored on the node to be replaced (601). This list can be obtained in several ways according to various embodiments. The list can be derived from the set of all replica chains in the system. Replica chains may be stored on each storage node with the corresponding object they describe such as, for example, in the extended attributes of an inode for the object. The replica chains can be retrieved from each storage node in the cluster other than the node to be replaced by, for instance, scanning all the objects on each node.

A less expensive approach would maintain a list of all replica chains on each storage node, independent of the objects to which they correspond. This would allow faster and more localized access to the chains. As another optimization, each storage node may maintain a list of the objects it contains for which it serves as a contributor during reconstruction. For example, storage node 501 would maintain a list for node 502 comprising objects A, B, and D (and their corresponding replica chains) since 501 is designated as the contributing node for restoring those objects to node 502. Likewise, node 501 would maintain a list comprising object E for reconstructing node 503.

As a further optimization, the lists a contributing node maintains may also include pointers to the objects themselves on that storage node. This approach may be efficiently implemented using directories. For example, suppose the storage device on a storage node is formatted with the EXT3 filesystem as may be the case for various embodiments. Objects can be accessed directly using the inode number in the corresponding data locator, bypassing EXT3's path translation mechanisms. However, each storage node can create a directory for other storage nodes in the system. For example, node 501 can create directories node 502/ and node 503/ in its EXT3 filesystem. When an object is first created on node 501, the node scans the replica chain to find which other node(s) it is responsible for. Node 501 creates an entry for the object in the directory corresponding to that node. Continuing the example, node 501 would have entries node 502/A, node 502/B, and node 502/D since node 501 contributes those objects to node 502 according to the replica chains. The structure of the EXT3 filesystem allows each directory entry to be linked to the inode of the corresponding object given in the data locator. When reconstructing node 502, the directory node 502/ on nodes 501 and 503 are simply read to obtain the objects each node is responsible for contributing to the reconstruction. Since these directory entries are created when the object is initially stored on the node and bypassed during normal operation, they do not impose a performance penalty on data access.

Referring again to FIG. 6, once the list of objects to be restored is obtained, the replacement node retrieves the objects from each contributing node in the list (602). Objects may be retrieved in parallel from multiple nodes to speed up the process. The replacement node stores the retrieved objects on its storage device according to the information in the replica chains (603). For instance, the object may be stored at a certain inode number specified by the chain. A patch to the EXT3 filesystem has been developed for this purpose. The patch adds a function create_by_inode to specify the inode when creating an object. Finally, the replacement node assumes the identity of the replaced node in the cluster (604). This may involve changing the IP address, DNS name, or other identifiers associated with the replacement node. Afterward, the replacement node performs all the duties and functions of the replaced node in the cluster. The replacement is transparent in that other nodes in the cluster need not be aware that a node was replaced.

Figure 7:
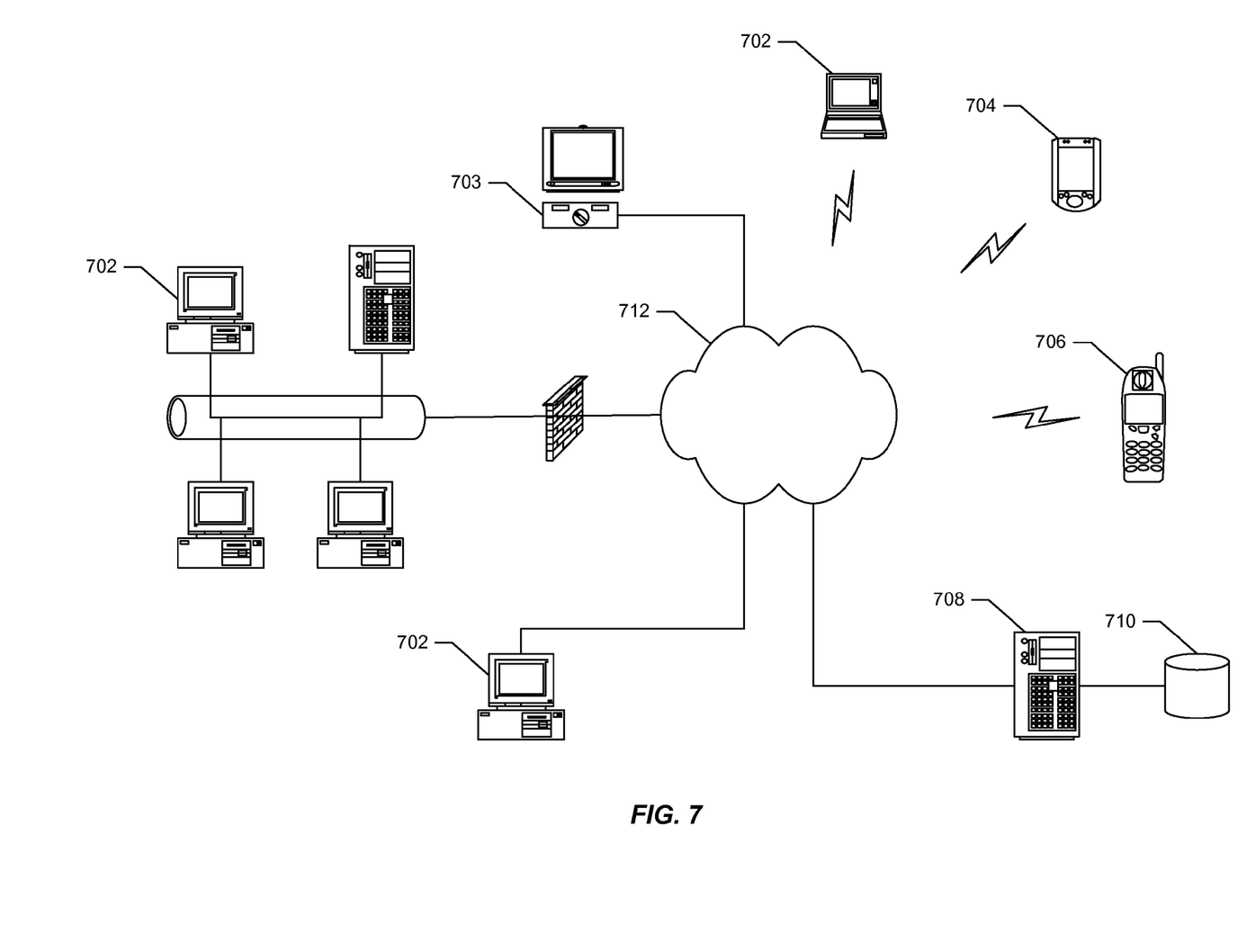
FIG. 7 illustrates some computing contexts in which embodiments of the invention may be practiced.

Embodiments of the present invention may be employed for data storage in any of a wide variety of computing contexts. For example, as illustrated in FIG. 7, implementations are contemplated in which the relevant population of users interact with a diverse network environment via any type of computer (e.g., desktop, laptop, tablet, etc.) 702, media computing platforms 703 (e.g., cable and satellite set top boxes and digital video recorders), handheld computing devices (e.g., PDAs) 704, cell phones 706, or any other type of computing or communication platform.

And according to various embodiments, data processed in accordance with the invention may be obtained using a wide variety of techniques. Data may be submitted by users visiting a web site, sending emails, sending instant messenger messages, posting to blogs, or any other online activity. Data may also be collected from or on behalf of users, such as storing browsing histories, user preferences or settings, marketing data, or data obtained through other sources (e.g. credit reports or social networking relationships). Data can comprise text, pictures, audio, or multimedia objects, among numerous other possibilities. Any type of data which can be stored on a computer system is contemplated.

Data stored according to the present invention may be processed in some centralized manner. This is represented in FIG. 7 by server 708 and data store 710 which, as will be understood, may correspond to multiple distributed devices and data stores. These servers and data stores may be colocated in the same datacenter to better take advantage of the features of various embodiments. The servers may comprise any heterogeneous computing devices suitable to the task and are not limited to cluster systems such as NASA's Beowulf or Apple's Xgrid. Similarly, the data stores may comprise any combination of storage devices including disk drives, flash memory devices, RAID arrays, or SAN appliances, among others. The servers and data stores may be connected by any type of communications links, including gigabit Ethernet, Infiniband, Fibre Channel, etc. The invention may also be practiced in a wide variety of network environments including, for example, TCP/IP-based networks, telecommunications networks, wireless networks, etc. These networks, as well as the various sites and communication systems from which data may be aggregated according to the invention, are represented by network 712.

In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for recreating a first storage node in a cluster comprising a plurality of storage nodes, the computer-implemented method being executed by one or more computing devices, the computer-implemented method comprising:

creating a replica chain for each object stored in the cluster, the created replica chain indicating selected storage nodes in the cluster storing replicas of the object, the created replica chain further identifying a storage address of the object on each selected storage node, wherein each selected storage node has a designated source node in the created replica chain;

identifying objects replicated on the first storage node with reference to other storage nodes of the plurality of storage nodes and without reference to the first storage node;

recreating each of the identified objects on a second storage node with reference to the other storage nodes and without reference to the first storage node, wherein each identified object and its corresponding storage address are copied from the designated source node for the object on the first storage node among the other storage nodes according to the created replica chain for the identified object; and designating the second storage node as a replacement node for the first storage node.

2. The computer-implemented method of claim 1 wherein the identifying comprises reading a directory of objects on one or more storage nodes among the other storage nodes, wherein each of the one or more storage nodes is designated as a source node by the created replica chain of each object in the directory.

3. The computer-implemented method of claim 1 wherein the storage address of each recreated object on the second storage node matches the storage address of the corresponding object on the first storage node.

4. The computer-implemented method of claim 1 wherein the other storage nodes serve object requests from an application node during the recreating.

5. A system for recreating a first storage node in a cluster comprising a plurality of storage nodes, the system comprising one or more computing devices comprising a processor, a memory, and a network interface attached to a network, the one or more computing devices configured to:

create a replica chain for each object stored in the cluster, the created replica chain indicating selected storage nodes in the cluster storing replicas of the object, the created replica chain further identifying a storage address of the object on each selected storage node, wherein each selected storage node has a designated source node in the created replica chain;

identify objects replicated on the first storage node with reference to other storage nodes of the plurality of storage nodes in the cluster and without reference to the first storage node;

recreate each of the identified objects on a second storage node with reference to the other storage nodes and without reference to the first storage node, wherein each identified object and its corresponding storage address are copied from the designated source node for the object among the other storage nodes according to the created replica chain for the identified object; and designate the second storage node as a replacement node for the first storage node.

6. The system of claim 5 further configured to identify objects replicated on the first storage node by reading a directory of objects on one or more storage nodes among the other storage nodes, wherein each of the one or more storage nodes is designated as a source node by the created replica chain of each object in the directory.

7. The system of claim 5 wherein the storage address of each recreated object on the second storage node matches the storage address of the corresponding object on the first storage node.

8. The system of claim 5 further configured to serve object requests from an application node with the other storage nodes during the recreating.

9. A computer program product for recreating a first storage node in a cluster comprising a plurality of storage nodes, the computer program product comprising at least one non-transitory computer-readable medium having computer instructions stored therein which are configured to cause a computing device to:

create a replica chain for each object stored in the cluster, the created replica chain indicating selected storage nodes in the cluster storing replicas of the object, the created replica chain further identifying a storage address of the object on each selected storage node, wherein each selected storage node has a designated source node in the created replica chain;

identify objects replicated on the first storage node with reference to other storage node of the plurality of the storage nodes in the cluster and without reference to the first storage node;

recreate each of the identified objects on a second storage node with reference to the other storage nodes and without reference to the first storage node, wherein each identified object and its corresponding storage address are copied from the designated source node for the object among the other storage nodes according to the created replica chain for the identified object; and designate the second storage node as a replacement node for the first storage node.

10. The computer program product of claim 9 further configured to identify objects replicated on the first storage node by reading a directory of objects on one or more storage nodes among the other storage nodes, wherein each of the one or more storage nodes is designated as a source node by the created replica chain of each object in the directory.

11. The computer program product of claim 9 wherein the storage address of each recreated object on the second storage node matches the storage address of the corresponding object on the first storage node.

12. The computer program product of claim 9 further configured to serve object requests from an application node with the other storage nodes during the recreating.

* * * * *